(12) United States Patent
Tanaka et al.

(10) Patent No.: US 7,513,522 B2
(45) Date of Patent: Apr. 7, 2009

(54) CURTAIN AIRBAG SYSTEM

(75) Inventors: Masami Tanaka, Toyota (JP);
Fumiyasu Hirai, Iwata (JP)

(73) Assignee: Mitsubishi Motors Corporation, Tokyo (JP)

( * ) Notice: Subject to any disclaimer, the term of this patent is extended or adjusted under 35 U.S.C. 154(b) by 431 days.

(21) Appl. No.: 11/046,755

(22) Filed: Feb. 1, 2005

(65) Prior Publication Data

US 2005/0189745 A1 Sep. 1, 2005

(30) Foreign Application Priority Data

Feb. 2, 2004 (JP) .............................. 2004-025542
Feb. 2, 2004 (JP) .............................. 2004-025543

(51) Int. Cl.
*B60R 21/16* (2006.01)

(52) U.S. Cl. ............... 280/730.2; 280/728.2; 280/728.3

(58) Field of Classification Search .............. 280/730.2, 280/728.1, 728.2, 728.3
See application file for complete search history.

(56) References Cited

U.S. PATENT DOCUMENTS 6,648,368 B2 * 11/2003 Smith et al. .............. 280/730.2
6,733,035 B2 * 5/2004 Thomas et al. ........... 280/730.2
6,796,576 B2 * 9/2004 Aoki et al. ................ 280/730.2
6,843,502 B2 * 1/2005 Aoki et al. ................ 280/730.2
7,083,188 B2 * 8/2006 Henderson et al. ........ 280/730.2
7,121,579 B2 * 10/2006 Ochiai et al. ............. 280/730.2
7,134,682 B2 * 11/2006 Totsuka et al. ........... 280/728.2
7,159,895 B2 * 1/2007 Aoki et al. ................ 280/730.2
7,159,896 B2 * 1/2007 Ochiai et al. ............. 280/730.2

FOREIGN PATENT DOCUMENTS

JP 10-278723 A 10/1998

* cited by examiner

*Primary Examiner*—Toan C To
(74) *Attorney, Agent, or Firm*—Birch, Stewart, Kolasch & Birch, LLP

(57) ABSTRACT

A curtain airbag system capable of protecting heads and the like of vehicle occupants and reliably preventing the occupants and the like from being thrown out of the vehicle when a predetermined or greater side impact is applied to the side body of the vehicle. Stretching member is provided along a curtain airbag that covers side windows so as to extend in the longitudinal direction of the vehicle and reach over a B pillar and a C pillar.

3 Claims, 12 Drawing Sheets

CURTAIN AIRBAG SYSTEM

CROSS-REFERENCE TO RELATED APPLICATIONS

This Non-provisional application claims priority under 35 U.S.C. § 119(a) on Patent Application Nos. 2004-25542 and 2004-25543 both filed in Japan on Feb. 2, 2004, the entire contents of which are hereby incorporated by reference.

BACKGROUND OF THE INVENTION

1. Field of the Invention

The present invention relates to a curtain airbag system, and more specifically to a curtain airbag system that deploys an airbag so as to cover an interior side face of a vehicle in the event of a side collision of the vehicle, to thereby protect vehicle occupants.

2. Description of the Related Art

A curtain airbag that is housed in a position folded along from a front pillar portion to a roof side rail portion of a vehicle has already been proposed. This curtain airbag is designed to protect vehicle occupants' heads. The airbag is deployed to cover an interior side face of a vehicle, including side windows, when a predetermined or greater side impact is applied to a side body of the vehicle in a side collision or the like.

A conventional airbag, however, is not fixed at its lower end portions, so that its reaction force against an applied load is poor, resulting in a failure in reliable suppression of the collision between occupants and the interior side face. It has also been impossible with a conventional airbag to completely eliminate the risk that occupants and the like are thrown out of the vehicle in the event that the vehicle turns over on its side or the like.

Given this factor, Unexamined Japanese Patent Publication No. 10-278723 discloses a curtain airbag system in which the front end portion of a curtain airbag is fixed to the front pillar portion of a vehicle, and the rear end portion to the rear of a roof side rail portion. According to this curtain airbag system, a tension line is formed on a line that links both the fixing points mentioned above. Moreover, by coupling the rear end of the lower end portion of the curtain airbag and the rear portion of the vehicle body with coupling means, such as a strap, there is formed another tension line at the lower end of the curtain airbag. The forming of such tension lines reinforces the reaction force of the curtain airbag.

In the technology disclosed in the above publication, however, tension exists only along the tension lines and not in the entire curtain airbag. This produces the problem that it is impossible to provide full protection of occupants if a force acting on the occupant toward the outside of the vehicle is great.

SUMMARY OF THE INVENTION

The invention has been made to solve the above-mentioned problem, and an object thereof is to provide a curtain airbag system that protects heads and the like of vehicle occupants and retains the occupants within a vehicle when a predetermined or greater impact is applied to a side body of the vehicle, to thereby improves its safety performance.

To achieve the above-mentioned object, the curtain airbag system of this invention comprises an airbag housed at least in a roof side rail portion of a vehicle for covering at least a part of an interior side face of the vehicle to form a curtain-like inflatable body as a whole when deployed; an inflator connected to the airbag for injecting gas into the airbag in response to the predetermined or greater side impact to the vehicle to inflate the airbag; and a stretching member formed to extend along the airbag in a longitudinal direction of the vehicle.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Embodiments of the invention will be described below with reference to the attached drawings.

Figure 1:
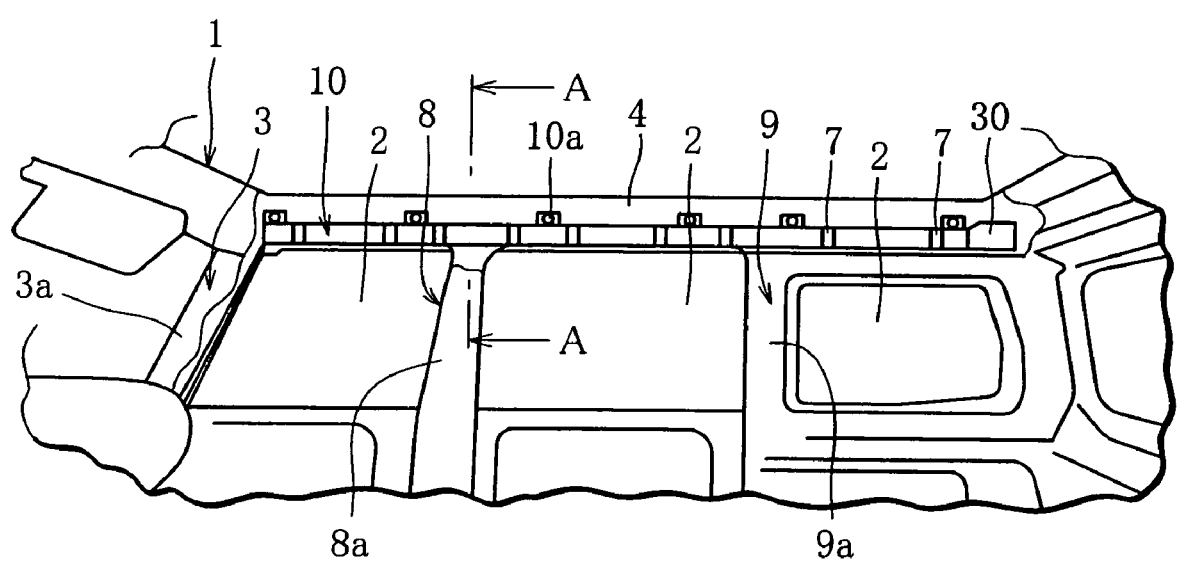
FIG. 1 is a side view showing a housed position of a curtain airbag system according to a first embodiment of the present invention.
Figure 2:
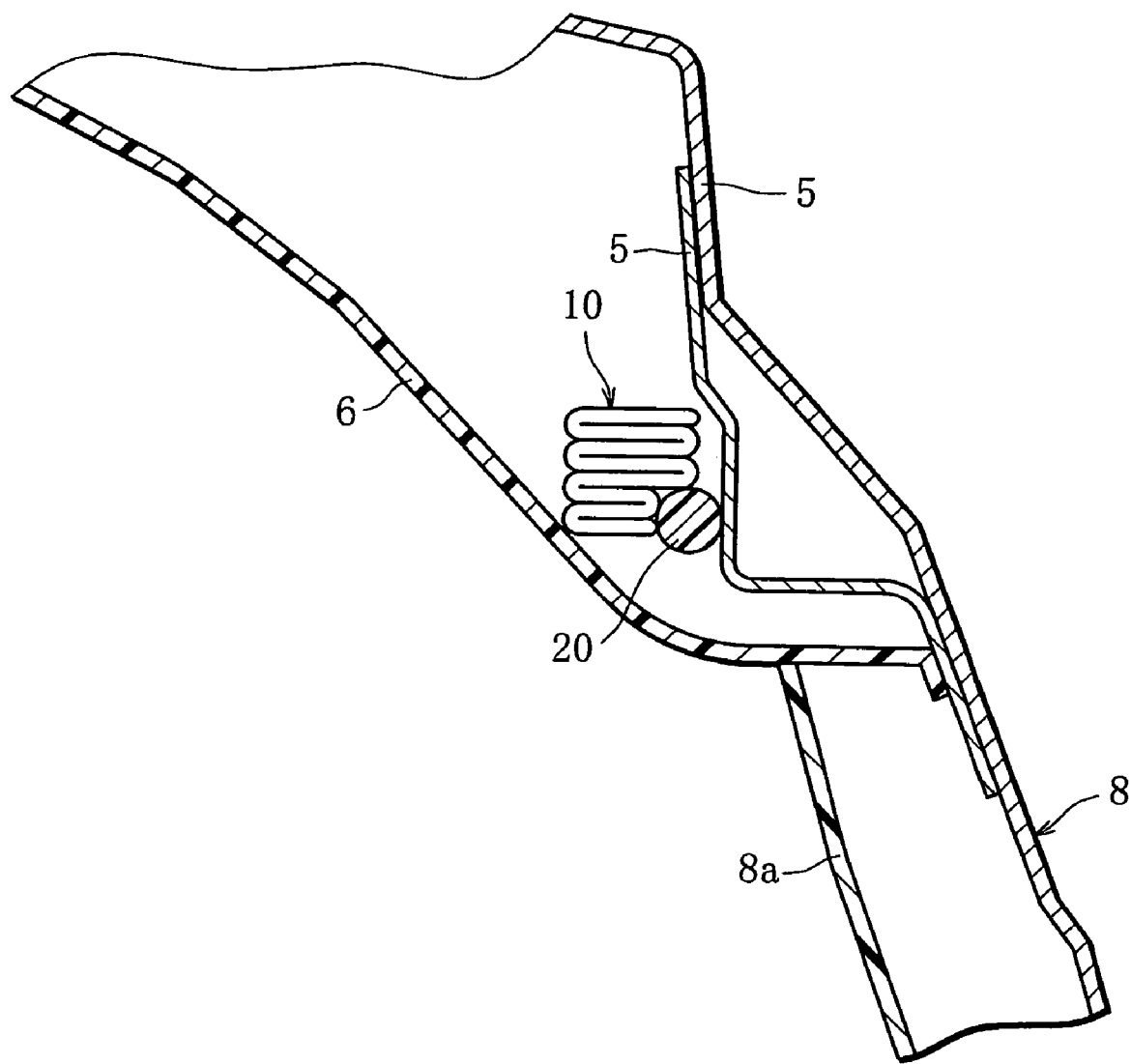
FIG. 2 is a cross-sectional view taken along line A-A of FIG. 1.

FIG. 1 is a side view showing a housed position of a curtain airbag system according to a first embodiment of the invention, and FIG. 2 is a cross-sectional view taken along line A-A of FIG. 1. With reference to FIGS. 1 and 2, a configuration of the curtain airbag system according to the first embodiment of the invention when in a housed position will be explained below.

As illustrated in FIG. 1, a vehicle 1 is, for example, of a type having relatively wide side windows 2 and a tall body.

As illustrated in FIG. 2, a curtain airbag (hereinafter simply referred to as an airbag) 10 extends along from a front pillar portion (A pillar portion) 3 to a roof side rail portion 4 of the vehicle 1, and is stored in a position folded in between a roof side rail member (vehicle body component) 5 and a roof trim (interior member) 6. The roof side rail member 5 constructs the roof side rail portion 4 of FIG. 1, and the roof trim 6 is so attached as to cover a surface of the roof side rail member 5 together with a roof panel. Concretely, the airbag 10 is sustained in its folded position by being wound with tapes 7 at several places. The airbag 10 is secured to the roof side rail member 5 through projections 10a disposed in an upper end portion of the airbag 10 at several places other than where the tapes 7 are wound. The airbag 10 is accommodated also in a front pillar trim 3a so as to extend from a front end portion of the roof side rail portion 4 to a lower end portion of the A pillar portion 3.

In a lower end portion of the airbag 10, a rod member 20 serving as a stretching member is disposed in the inside of the airbag 10. The rod member 20 is retained for example in a position on the side of the roof side rail member 5 under the airbag 10.

Disposed in a rear end portion of the roof side rail portion 4 is an inflator 30 connected to a rear end portion of the airbag 10.

The roof trim 6 has a tip end that is detachably fastened to the roof side rail member 5 by using a center pillar trim 8a of a center pillar portion (B pillar portion) 8 and a quarter pillar trim 9a of a quarter pillar portion (C pillar portion) 9 as shown in FIG. 2. Tip ends of the front pillar trim 3a are detachably fastened by using a door opening trim, not shown.

Figure 3:
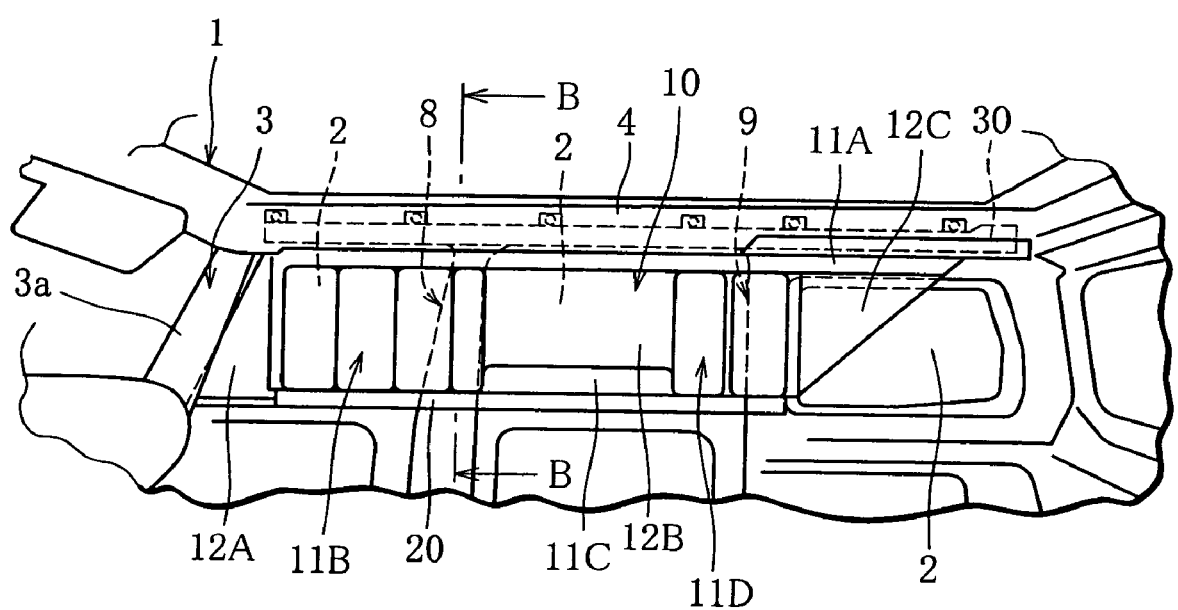
FIG. 3 is a side view showing a deployed position of the curtain airbag system according to the first embodiment of the invention.
Figure 4:
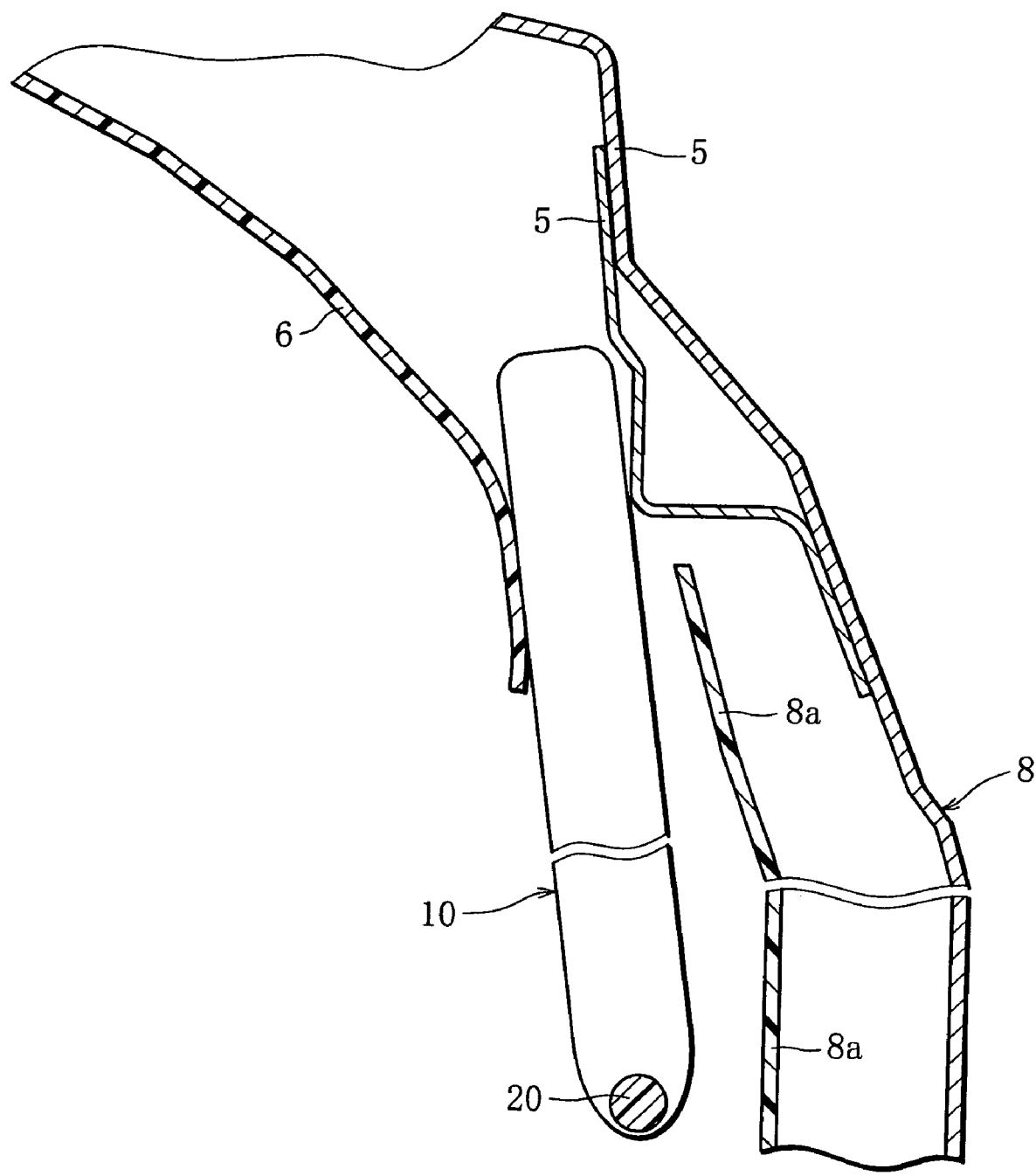
FIG. 4 is a cross-sectional view taken along line B-B of FIG. 3.

FIG. 3 is a side view showing a deployed position of the curtain airbag system of the first embodiment, and FIG. 4 is a cross-sectional view taken along line B-B of FIG. 3. A configuration of the curtain airbag system of the first embodiment when deployed will be described below with reference to FIGS. 3 and 4.

As illustrated in FIG. 3, the airbag 10 is made up of an inflatable portion 11A provided along the roof side rail portion 4 located in the upper end portion, an inflatable portion 11B and a fabric portion 12A both positioned on a front seat side, and inflatable portions 11C and 11D and fabric portions 12B and 12C all positioned on a back seat side.

To be more precise, the inflatable portions 11A and 11C are cylindrical inflatable bodies extending in a longitudinal direction of the vehicle, and the inflatable portions 11B and 11D are formed of a plurality of cylindrical inflatable bodies extending in a vertical direction of the vehicle. The inflatable portion 11A internally communicates with each of the inflatable bodies of the inflatable portions 11B and 11D, while the inflatable portion 11C internally communicates with the inflatable bodies of the inflatable portions 11B and 11D that are disposed with the inflatable portion 11C therebetween.

A front end of a lower end portion of the triangular fabric portion 12A is secured to the A pillar portion 3, while a side of a rear end thereof is joined to a side of a front end of the inflatable portion 11B. Each side of the four-sided fabric portion 12B is joined to the inflatable portions 11A, 11B, 11C and 11D respectively. A side of an upper end of the triangular fabric portion 12C is joined to the inflatable portion 11A, and a side of a front end to the inflatable portion 11D.

A material of the rod member 20 contained in the lower end portion of the airbag 10 is, for example, resin having a certain amount of weight and provided with rigidity and elasticity. The rod member 20 has a circular section and extends from the inflatable portion 11B through the inflatable portion 11D, reaching over the B pillar portion 8 and the C pillar portion 9. In addition, the rod member 20 here is provided only to an area along the roof side rail portion 4 that extends substantially straight. This makes it possible to easily dispose the rod member 20 in the lower end portion of the airbag 10 without a bending process or the like.

Operation of the curtain airbag system thus configured according to the first embodiment of the invention will be explained below.

If a predetermined or greater side impact is applied to a side body of the vehicle 1 in a side collision or the like, an airbag activation sensor, not shown, sends a signal to a control unit, also not shown. In response to the signal, the control unit sends an activation signal to the inflator 30, and the inflator 30 then injects gas into the airbag 10. The gas from the inflator 30 flows into the inflatable portion 11A of the airbag 10, which expands the inflatable portion 11A. The expansion of the inflatable portion 11A breaks the tapes 7, and the gas sequentially flows into the inflatable portions 11D, 11B and 11C to expand the inflatable portions 11D, 11B and 11C. At the same time, the fabric portions 12A, 12B and 12C are also deployed.

In this process, when evaginating out of the roof side rail portion 4, the airbag 10 presses the roof trim 6 by using the rod member 20 contained in the lower end portion thereof, and releases the tip end of the roof trim 6 from the pillar trims 8a, 9a and the door opening trim to detach the tip end of the roof trim 6 from the roof side rail member 5, as shown in FIG. 4. The airbag 10 is then deployed while pushing and bending the roof trim 6 toward the inside of the vehicle as shown in FIG. 3. To be short, the tip end of the roof trim 6 can be easily detached from the roof side rail member 5 by means of the rod member 20, which enables prompt and reliable deployment of the airbag 10.

Although the tip end of the roof trim 6 is detached from the roof side rail member 5 by using the rod member 20 in this embodiment, the system may have a configuration in which the rod member 20 directly breaks through the roof trim 6.

Since the airbag 10 is deployed to cover the interior side face including the side windows 2 and the like in the above-described manner, if the head and the like of an occupant is moved toward the interior side face of a vehicle in reaction to a side impact to the vehicle 1, the head and the like of the occupant is well protected.

Furthermore, the airbag 10 is wholly applied with tension due to the weight of the rod member 20, and the rod member 20 hits against the B pillar portion 8 and the C pillar portion 9 to be supported. It is therefore possible to suppress a collision between occupants and the interior side face of the vehicle. Moreover, the occupants do not slip through the airbag 10 to be thrown out of the vehicle and are protected in the vehicle without fail.

The airbag 10 also prevents glass shards and the like from getting into the vehicle, which are produced when the side windows 2 are broken under the side impact to the vehicle 1.

Even after the inflatable portions 11A, 11B, 11C and 11C are degased and deflated, the airbag 10 keeps covering the side windows 2 due to the weight of the rod member 20. Therefore even if another side impact is applied to the side body of the vehicle 1 or the vehicle 1 turns over on its side, the occupants are prevented from being thrown out of the vehicle.

As explained above, the curtain airbag system according to the invention protects the heads and the like of occupants and averts the throw-out of occupants and the like in the event that the predetermined or greater side impact is applied to a side body of the vehicle, to thereby enhance the safety performance of the vehicle.

The explanation about the curtain airbag system according to the first embodiment of the invention is finished, but embodiments are not limited to the first embodiment.

Figure 5:
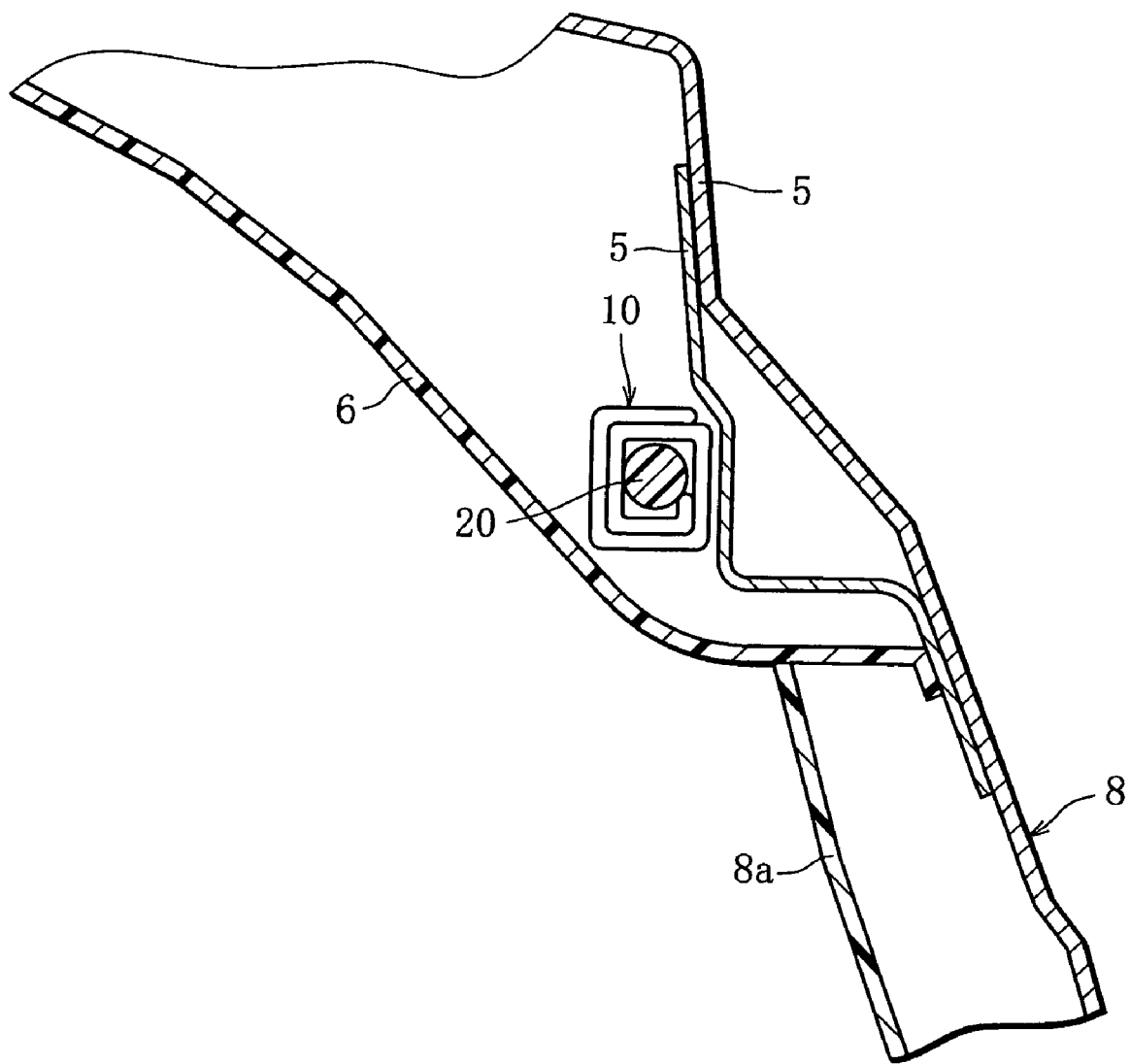
FIG. 5 is a cross-sectional view taken along line A-A of FIG. 1 when an airbag is wrapped around a rod member and brought into its housed position.

Although in the first embodiment, the airbag 10 is stored in its folded position, this is not the only way to accommodate the airbag 10. For instance, the airbag 10 may be housed in a rolled position with the rod member 20 placed at the center as shown in FIG. 5.

Figure 6:
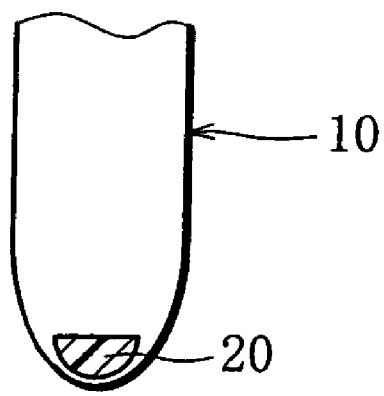
FIG. 6 is a cross-sectional view of a lower end of the airbag when the rod member has a semicircular section in the first embodiment of the invention.

The rod member 20 has a circular section in the first embodiment, but the rod member 20 has only to be disposed to extend in the longitudinal direction. For instance, the rod member 20 may have a semicircular section as illustrated in FIG. 6. The rod member 20 may also be a hollow rod member or the like.

Figure 7:
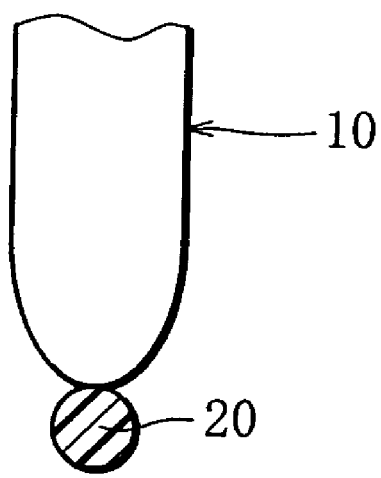
FIG. 7 is a cross-sectional view of the lower end of the airbag when the rod member is coupled to the lower end of the airbag in the first embodiment of the invention.

Moreover, the rod member 20 is arranged in the inside of the lower end portion of the airbag 10 in the first embodiment. The rod member 20, however, may be disposed in another position as long as the rod member 20 can cause tension in the lower end of the airbag 10. For instance, the rod member may be joined to the outside of the lower end of the airbag 10 as illustrated in FIG. 7.

According to the first embodiment, the material of the rod member 20 is resin, but is not limited to this. More specifically, the rod member 20 has only to have enough weight and rigidity to heighten the tension at the time of airbag deployment. Preferably, the rod member 20 is made of resin or rubber material in the view of occupant protection.

Also in the first embodiment, the inflator 30 is connected to the rear end of the airbag 10, but does not have to be connected thereto. For instance, the inflator 30 may be connected to the front end or central portion of the airbag 10.

Although the airbag 10 is made up of the inflatable portions 11A, 11B, 11C and 11D and the fabric portions 12A, 12B and 12C in the first embodiment, the airbag 10 does not have to be configured in this way. The rod member may be provided to a curtain airbag having another configuration.

Furthermore, according to the first embodiment, the vehicle equipped with the curtain airbag is of a type having relatively wide side windows. The vehicle, however, is not limited to this type, but may be of any other type. Only if the vehicle is of a type in which the A pillar portion and the roof side rail portion are curved, the rod member is designed to be housed in a curved position.

A second embodiment of the invention will be described below with reference to the drawings.

A configuration of the curtain airbag system of the second embodiment of the invention differs from that of the first embodiment simply in the stretching member itself and the arrangement thereof in relation to the airbag. Other configurations are virtually identical to those of the first embodiment.

Figure 8:
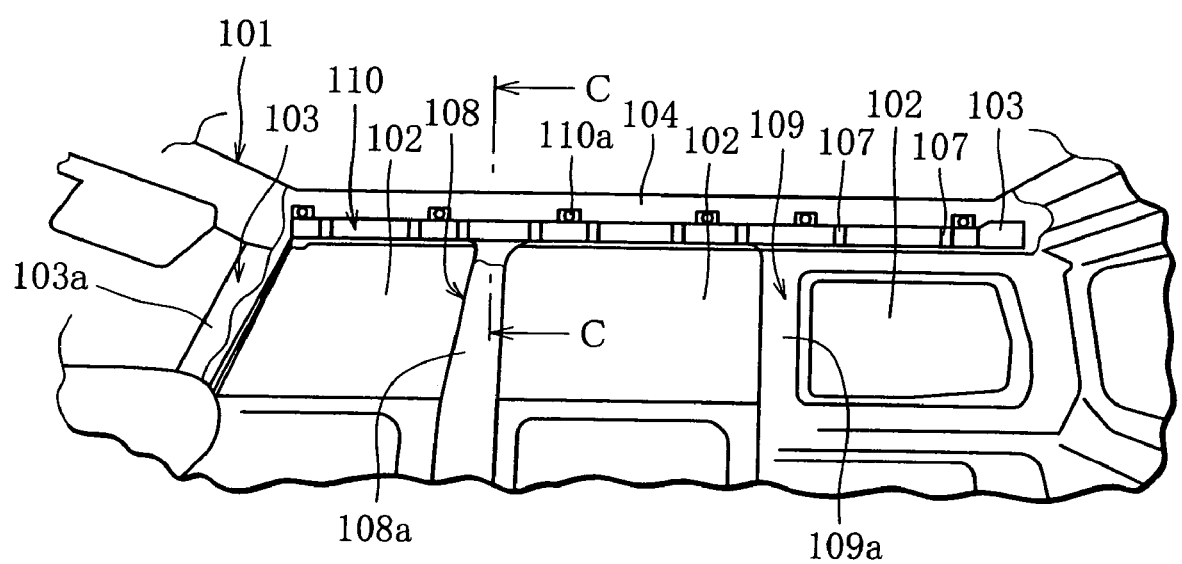
FIG. 8 is a side view showing a housed position of a curtain airbag system according to a second embodiment of the invention.
Figure 9:
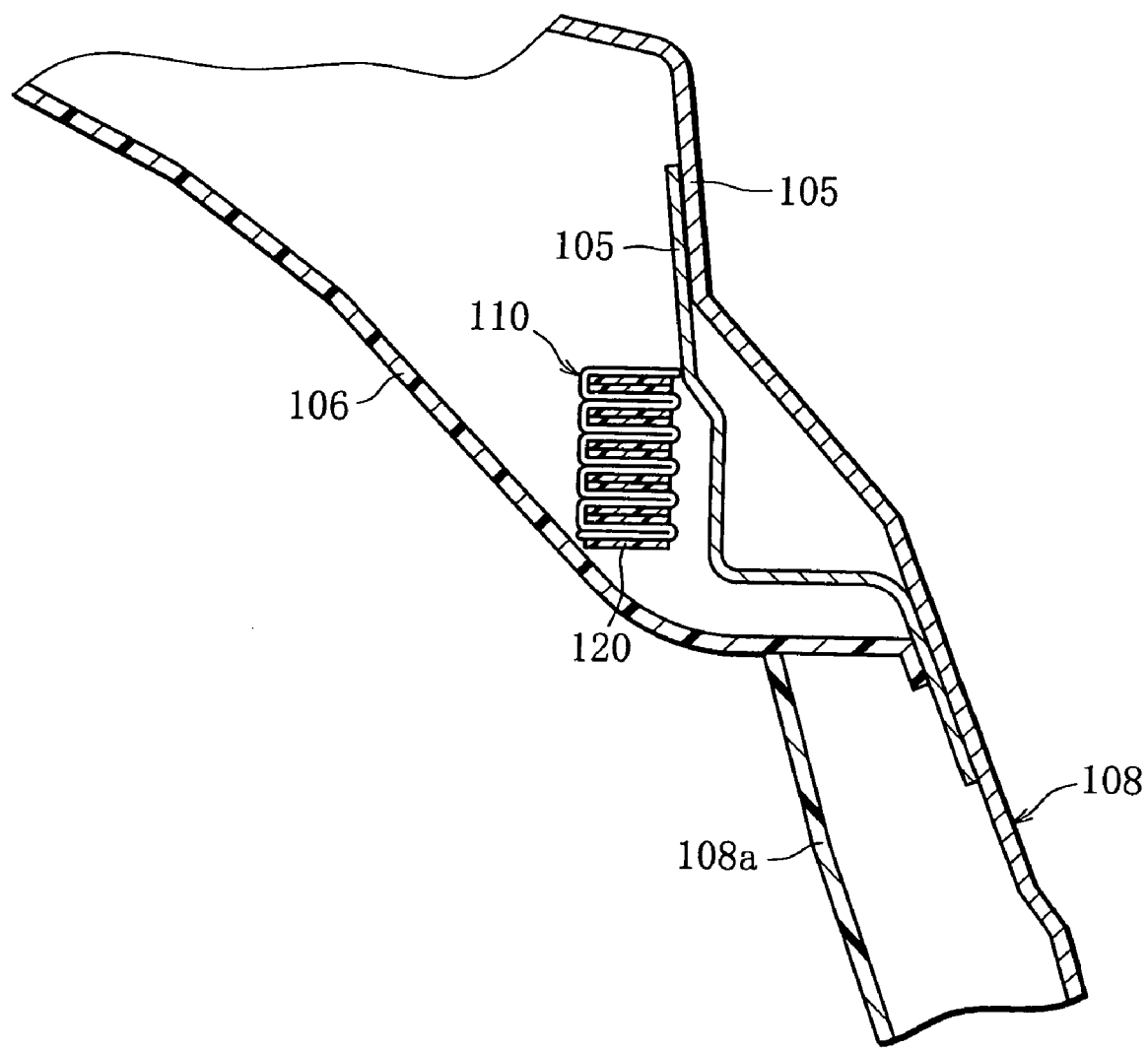
FIG. 9 is a cross-sectional view taken along line C-C of FIG. 8.

FIG. 8 is a side view showing a housed position of a curtain airbag system according to a second embodiment of the invention. FIG. 9 is a cross-sectional view taken along line C-C of FIG. 8. A configuration of the curtain airbag system of the second embodiment of the invention in its housed position will be described below with reference to FIGS. 8 and 9.

As illustrated in FIG. 8, a vehicle 101 is, for example, of a type having relatively wide side windows 102 and a tall body.

As illustrated in FIG. 9, a curtain airbag (hereinafter simply referred to as an airbag) 110 extends along from a front pillar portion (A pillar portion) 103 to a roof side rail portion 104 of the vehicle 101, and is stored in a position folded in between a roof side rail member (vehicle body component) 105 and a roof trim (interior member) 106. The roof side rail member 105 configures the roof side rail portion 104 of FIG. 8. The roof trim 106 is installed to cover a surface of the roof side rail member 105 together with a roof panel. To be concrete, the airbag 110 is sustained in its folded position by being wound with tapes 107 at several places. The airbag 110 is fixed to the roof side rail member 105 through projections 110a disposed in an upper end portion of the airbag 110 at several places other than where the tapes 107 are wound. The airbag 110 is accommodated also in a front pillar trim 103a so as to extend from a front end portion of the roof side rail portion 104 to a lower end portion of the A pillar portion 103.

Plate members 120 serving as stretching members are arranged at places except where creases exist in one side of the airbag 110, which faces the outside of the vehicle at the time of deployment, in parallel with one another.

In a rear end portion of the roof side rail portion 104, there is disposed an inflator 130 connected to a rear end portion of the airbag 110.

As illustrated in FIG. 9, a tip end of the roof trim 106 is detachably fastened to the roof side rail member 105 by using a center pillar trim 108a of a center pillar portion (B pillar portion) 108 and a quarter pillar trim 109a of a quarter pillar portion (C pillar portion) 109. The front pillar trim 103a has tip ends that are detachably fastened by using a door opening trim, not shown.

Figure 10:
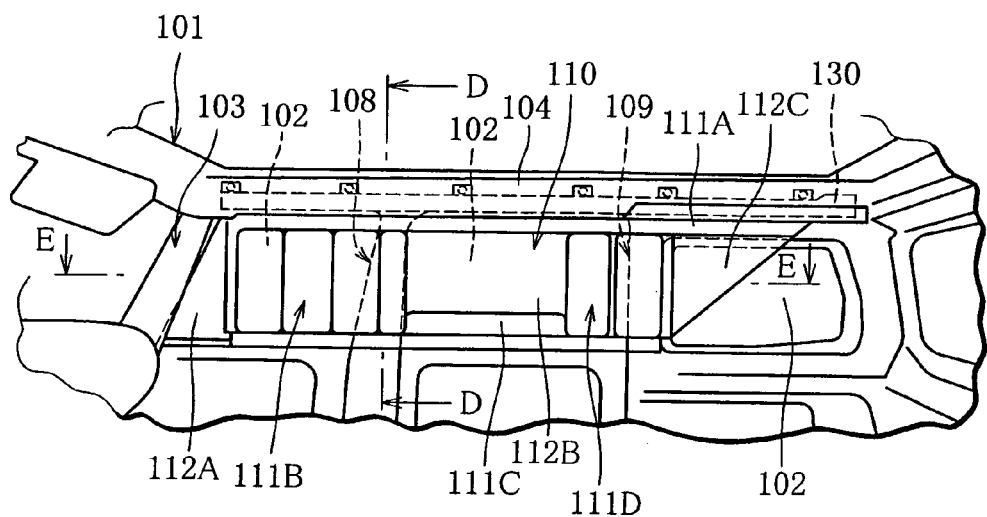
FIG. 10 is a side view showing a deployed position of the curtain airbag system according to the second embodiment of the invention, viewed from the inside of a vehicle.
Figure 11:
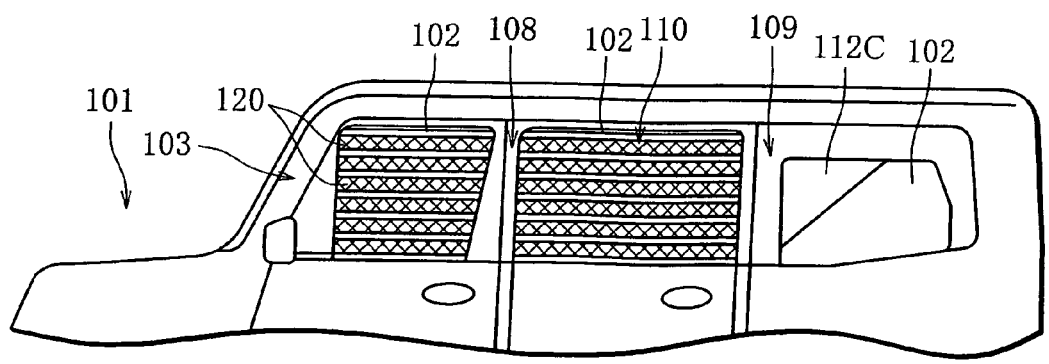
FIG. 11 is a side view showing the deployed position of the curtain airbag system according to the second embodiment of the invention, viewed from the outside of the vehicle.
Figure 12:
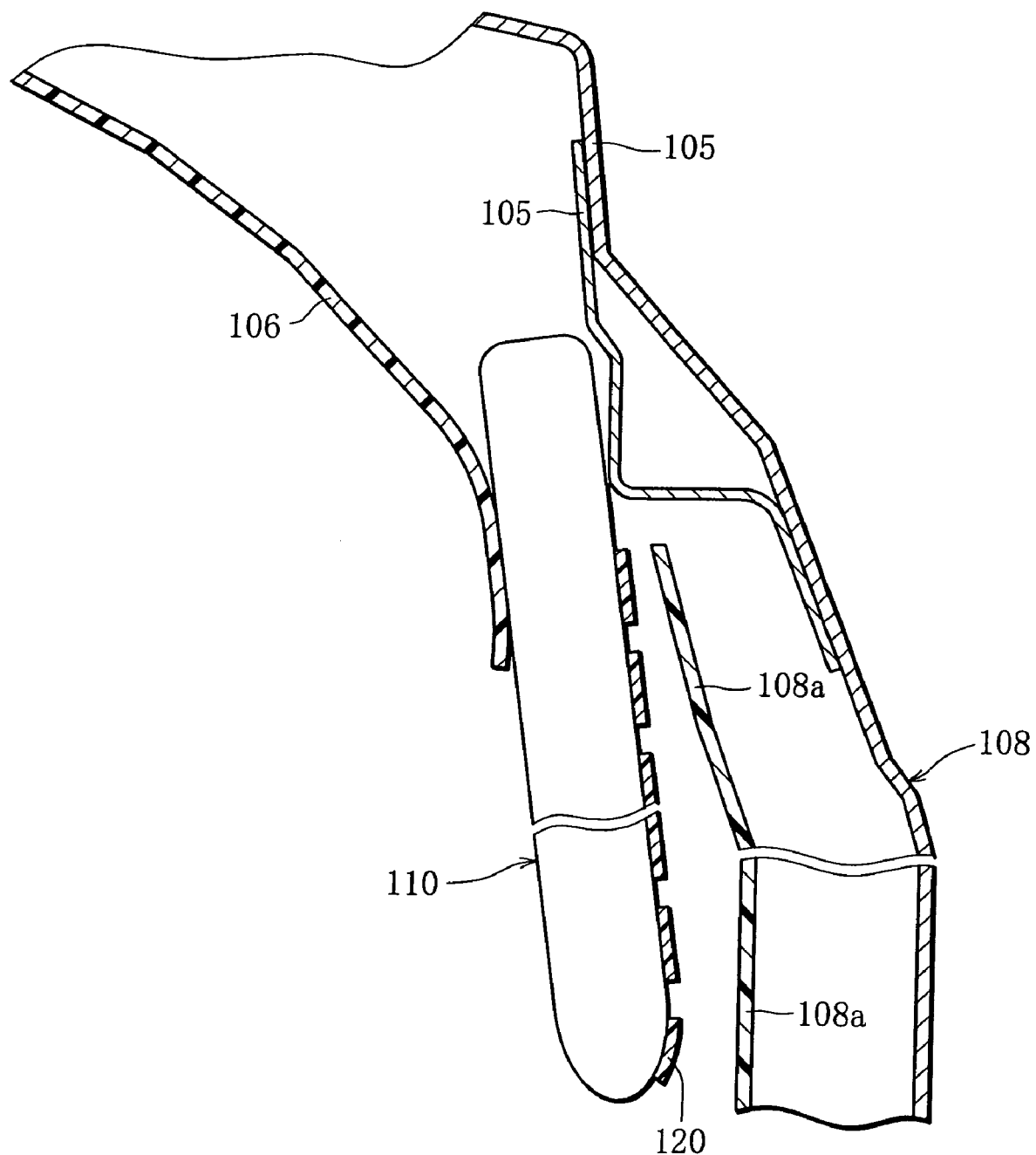
FIG. 12 is a cross-sectional view taken along line D-D of FIG. 10.
Figure 13:
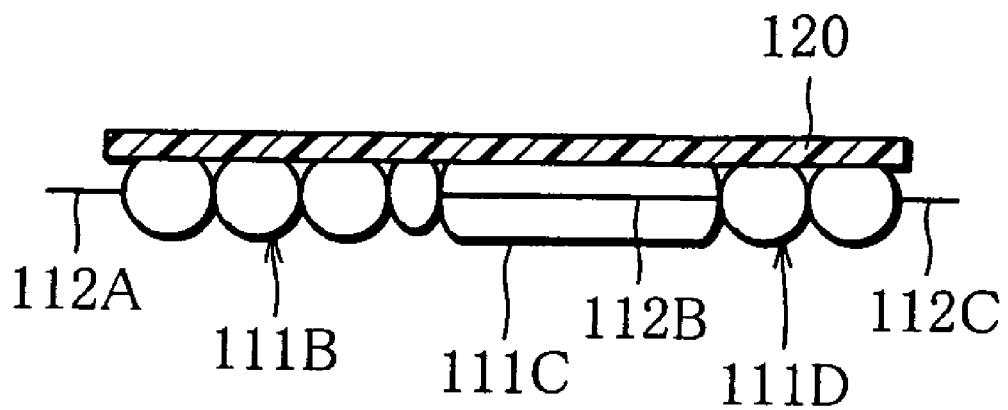
FIG. 13 is a cross-sectional view taken along line E-E of FIG. 10.

FIG. 10 is a side view showing a deployed position of the curtain airbag system according to the second embodiment of the invention, viewed from the inside of a vehicle. FIG. 11 is a side view showing a deployed position of the curtain airbag system of the second embodiment, viewed from the outside of the vehicle. FIG. 12 is a cross-sectional view taken along line D-D of FIG. 10, and FIG. 13 is a cross-sectional view taken along line E-E of FIG. 10. A configuration of the curtain airbag system in its deployed position according to the second embodiment of the invention will be described below with reference to FIGS. 10 through 13.

The airbag 110 is formed of an inflatable portion 111A disposed in an upper end portion thereof so as to extend along the roof side rail portion 104, an inflatable portion 111B and a fabric portion 112A disposed on a front seat side, and inflatable portions 111C and 111D and fabric portions 112B and 112C disposed on a back seat side.

To be precise, the inflatable portions 111A and 111C are cylindrical inflatable bodies that extend in the longitudinal direction of the vehicle, and each have a circular section, for example. The inflatable portions 111B and 111D are each made up of a plurality of cylindrical inflatable bodies extending in the vertical direction of the vehicle and each having a circular section, for example. The inflatable portion 111A internally communicates with each of the inflatable bodies of the inflatable portions 111B and 111D. The inflatable portion 111C internally communicates with the inflatable bodies of the inflatable portions 111B and 111D arranged with the inflatable portion 111C therebetween.

A front end of a lower end portion of the triangular fabric portion 112A is fixed to the A pillar portion 103, while a side of a rear end is joined to a side of a front end of the inflatable portion 111B. Each side of the four-sided fabric portion 112B is joined to the inflatable portions 111A, 111B, 111C and 111D respectively. A side of an upper end of the triangular fabric portion 112C is joined to the inflatable portion 111A, and a side of a front end to the inflatable portion 111D.

As shown by hatching lines in FIG. 11, the plate members 120 extending in the longitudinal direction of the vehicle are arranged in one side of the airbag 110, which faces the outside of the vehicle, in the vertical direction in parallel with one another.

A material of the plate members 120 is, for example, resin having a certain amount of weight and provided with rigidity and elasticity. The plate members 120 extend from the inflatable portion 111B through the inflatable portion 111D, reaching over the center pillar portion 108 and a quarter pillar portion 109, and are arranged in parallel with one another at regular intervals which function as creases when the airbag 110 is stored. More specifically, as illustrated in FIG. 13, the plate members 120 are glued with an adhesive agent or the like to for example a part of one side of each of the inflatable bodies, namely the inflatable portions 111A, 111B, 111C and 111D, and the side facing the outside of the vehicle. The plate members 120 here are provided only to an area along the roof side rail portion 104 that extends substantially straight. This makes it possible to easily arrange the plate members 120 in the airbag 110 in parallel with one another without a bending process or the like.

Operation of the curtain airbag system thus structured according to the second embodiment of the invention will be explained below.

If a predetermined or greater side impact is applied to the side body of the vehicle 101 in a side collision or the like, an airbag activation sensor, not shown, sends a signal to a control unit, also not shown. In response to the signal, an activation signal is sent from the control unit to the inflator 130. As a result, the inflator 130 injects gas into the airbag 110. The gas from the inflator 130 flows into the inflatable portion 111A of the airbag 110 to expand the inflatable portion 111A. The expansion of the inflatable portion 111A breaks the tapes 107. The gas further flows into the inflatable portions 111D, 111B and 111C in order, to thereby expand the inflatable portions 111D, 111B and 111C. At the same time, the fabric portions 112A, 112B and 112C are sequentially deployed.

In this process, when evaginating out of the roof side rail portion 104, the airbag 110 presses the roof trim 106 mainly by using the plate member 120 disposed in the lowest end of the airbag 110 as shown in FIG. 12. Consequently, the tip end of the roof trim 106 is released from the pillar trims 108a, 109a and the door opening trim and detached from the roof side rail member 105. The airbag 110 is deployed while pushing and bending the roof trim 106 toward the inside of the vehicle as shown in FIGS. 10 and 11.

In this embodiment, the tip end of the roof trim 106 is detached from the roof side rail member 105 mainly by using the plate member 120 arranged in the lowest end of the airbag 110. However, the system may have a configuration in which the plate members 120 directly break through the roof trim 106.

As stated above, since the airbag 110 is deployed to cover the interior side face of the vehicle, including the side windows 102 and the like, when the side impact thrusts an occupant toward the outside of the vehicle 101, the head and the like of the occupant is protected.

The airbag 110 is taut in the longitudinal direction due to the rigidity and elasticity of the plate members 120, and is simultaneously applied with tension in the vertical direction due to the weight of the plate members 120. In addition, the plate members 120 hit against the B pillar portion 108 and the C pillar portion 109 to be supported. As a consequence, vehicle occupants are caught by the entire airbag 110 and protected in the vehicle without fail.

Furthermore, the airbag 110 prevents glass shards and the like from getting into the vehicle, which are produced when the side windows 102 are broken under the side impact to the vehicle 101.

Even after the inflatable portions 111A, 111B, 111C and 111D are degased and deflated, the airbag 110 keeps covering the interior side face including the side windows 102 and the like without being deflated as a whole, due to the presence of the plate members 120. Therefore, even if another side impact is applied to the side body of the vehicle 101 again or the vehicle 101 turns over on its side, occupants are prevented from being thrown out of the vehicle.

As described above, the curtain airbag system of the second embodiment of the invention protects the head and the like of an occupant and averts the thrown-out of occupants and the like when the predetermined or greater side impact is applied to the side body of the vehicle. This improves the safety performance of the vehicle.

Although the explanation about the curtain airbag system of the second embodiment of the invention is finished, embodiments are not limited to the second embodiment.

Figure 14:
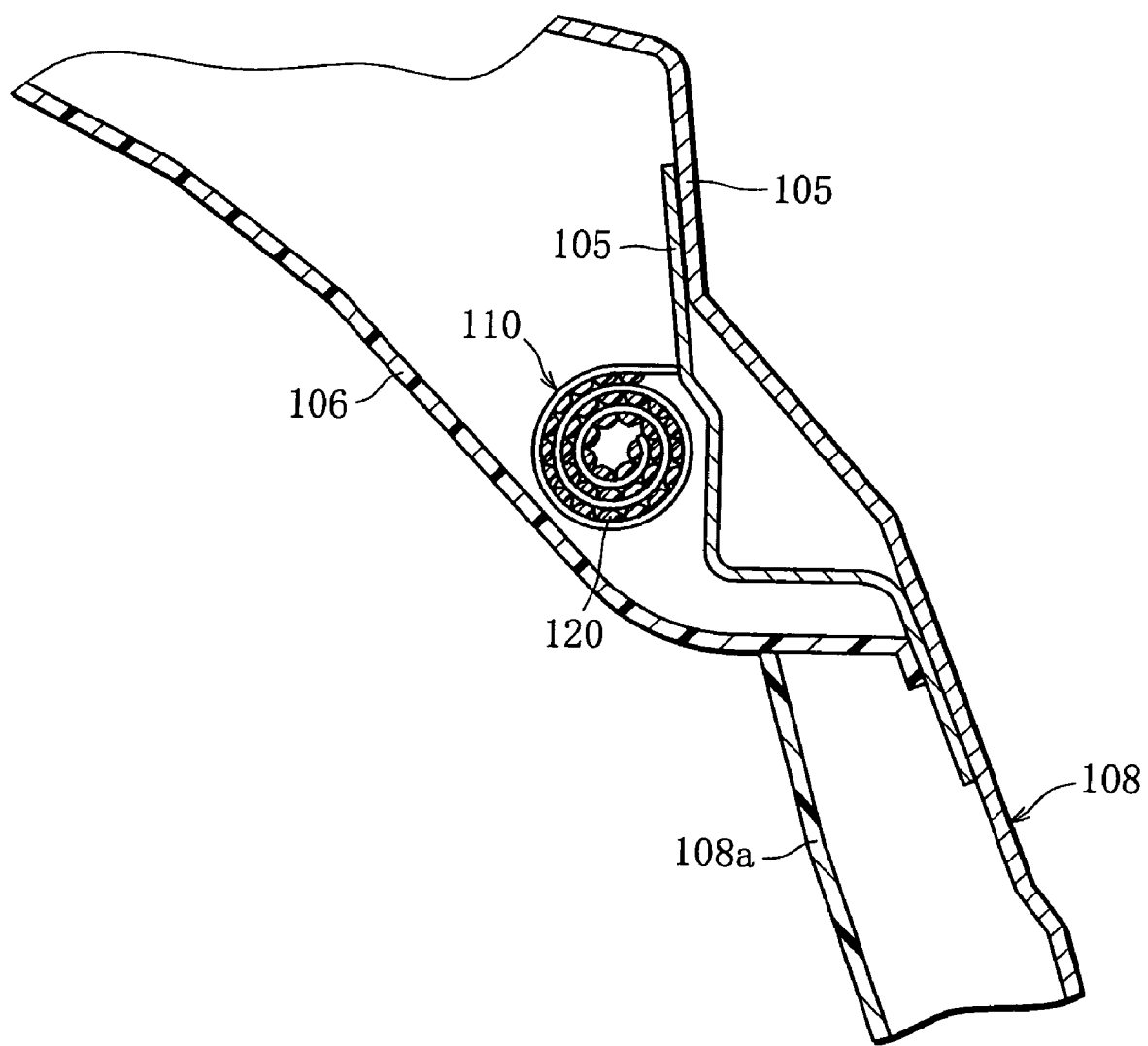
FIG. 14 is a cross-sectional view taken along line C-C of FIG. 8 when the airbag is wrapped and brought into its housed position.

According to the second embodiment, the airbag 110 provided with the plate members 120 each having a rectangular cross section is stored in the folded position. The cross-sectional shape of the plate member and the storage method of the airbag are not limited to these. For instance, the airbag 110 may be provided with plate members each having a trapezoidal cross section and may be housed in a rolled position, as illustrated in FIG. 14.

Figure 15:
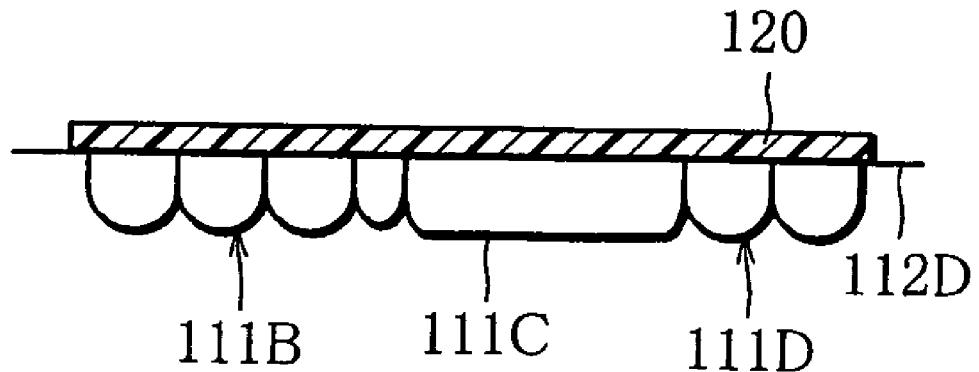
FIG. 15 is a cross-sectional view taken along line E-E of FIG. 10 when the airbag is formed to have a fabric portion made of one sheet of fabric in the second embodiment of the invention.

In the second embodiment, the inflatable portions 111A, 111B, 111C and 111D of the airbag 110 are each formed as a cylindrical inflatable body having for example a circular section, and the plate members 120 are bonded to a part of each of the inflatable bodies. However, the configuration of the airbag and the installment of the plate members are not limited to these. For instance, the plate members may be arranged in one side of a sheet of fabric 112D, which faces the outside of the vehicle, in parallel with one another as shown in FIG. 15, to thereby form each of the inflatable portions so as to expand toward the inside of the vehicle.

Furthermore, according to the second embodiment, the plate members 120 are evenly space apart. The spacing, however, is not limited to this, and the spaces may not be equal.

Although in the second embodiment, the plate members 120 are placed in the entire airbag 110 in a vertical direction in parallel with one another, this is not the only way to arrange the plate members 120. On the contrary, the plate members 120 may be disposed only in a particular part of the airbag 110, for example, in a middle portion in the vertical direction or in a lower portion or in the lower end portion.

The material of the plate members 120 is resin in the second embodiment, but is not limited to this. That is to say, the plate members 120 may be made of another material as long as the material has enough weight and rigidity to heighten the tension at the time of the airbag deployment. For instance, the material of the plate members 120 may be a rubber material or the like, and further may be metal or the like unless the plate members directly touch vehicle occupants.

Moreover according to the second embodiment, the plate members 120 are used as stretching members, but are not limited to this. On the contrary, the plate members 120 have only to be disposed to extend in the longitudinal direction like the rod members, for example.

The airbag 110 is accommodated from the inside of the A pillar portion 103 through the inside of the roof side rail portion 104 in the second embodiment, but is not limited to this. For instance, the airbag may be stored only in the roof side rail portion.

Although in the second embodiment, the inflator 130 is connected to the rear end of the airbag, the inflator 130 does not have to be connected to this position. For instance, the inflator 130 may be connected to, for example, the front end or central portion of the airbag 110.

Furthermore, according to the second embodiment, the vehicle equipped with the curtain airbag system is of a type having relatively wide side windows. However, the type is not limited to this, and the vehicle may be of any other type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A curtain airbag system deployed to protect an occupant when a predetermined or greater side impact is applied to a vehicle, comprising:
    an airbag housed at least in a roof side rail portion of the vehicle for covering at least a part of an interior side face of the vehicle when deployed to form a curtain-like inflatable body as a whole;
    an inflator connected to said airbag for injecting gas into said airbag when the predetermined or greater side impact is applied to the vehicle, to thereby expand said airbag; and
    a stretching member formed to extend along said airbag in a longitudinal direction of said vehicle,
    said stretching member being attached to an inflatable portion of said airbag to maintain said airbag in a deployed state after an initial deployment thereof; wherein
    said stretching member is provided to a lower end portion of said airbag and extends in the longitudinal direction of said vehicle;
    said stretching member being provided only to that portion of said airbag which is housed in said roof side raid portion; and
    said stretching member is housed in between a vehicle body component constructing said roof side rail portion of said vehicle and an interior member fixed onto a surface of said vehicle body component together with said airbag so that said stretching member is positioned under said airbag; and
    said stretching member presses said interior member when said airbag is deployed, to thereby detach at least a part of said interior member from said vehicle body component.

2. The curtain airbag system according to claim 1, wherein:
    said stretching member reaches over at least two pillar portions of said vehicle at the time of deployment of said airbag.

3. The curtain airbag system according to claim 1, wherein:
a material of said stretching member is resin.

* * * * *